United States Patent [19]

Kortering et al.

[11] Patent Number: 4,633,789
[45] Date of Patent: Jan. 6, 1987

[54] TOOLLESS MOUNTING ARRANGEMENT

[75] Inventors: Randall L. Kortering, Zeeland; Gordon C. Berry, Grand Rapids, both of Mich.

[73] Assignee: Haworth, Inc., Holland, Mich.

[21] Appl. No.: 841,010

[22] Filed: Mar. 14, 1986

Related U.S. Application Data

[63] Continuation of Ser. No. 641,916, Aug. 17, 1984.

[51] Int. Cl.$^4$ .............................................. A47B 5/00
[52] U.S. Cl. .................................. 108/152; 248/223.1; 312/195; 312/245
[58] Field of Search ............... 312/194, 195, 196, 197, 312/245; 108/152

[56] References Cited

U.S. PATENT DOCUMENTS

| | | | |
|---|---|---|---|
| 2,455,991 | 12/1948 | Goldfield et al. | 312/195 |
| 2,621,357 | 12/1952 | Stuman | 248/223.1 |
| 3,697,034 | 10/1972 | Shell | 248/243 |
| 3,862,789 | 1/1975 | Korell et al. | 312/194 |
| 3,942,669 | 3/1976 | Savage, Jr. | 312/245 |
| 4,317,416 | 3/1982 | Baum et al. | 248/223.1 |
| 4,332,205 | 6/1982 | Corl, Jr. | 312/245 X |
| 4,470,716 | 9/1984 | Welch | 248/223.1 |

FOREIGN PATENT DOCUMENTS

137589 1/1920 United Kingdom ................. 24/669

*Primary Examiner*—James T. McCall
*Attorney, Agent, or Firm*—Flynn, Thiel, Boutell & Tanis

[57] ABSTRACT

An arrangement for mounting a removable accessory such as a drawer unit to the underside of a work surface without the use of tools. A pair of front and rear slot and projection couplings are used to mount the accessory on the underside of the work surface, and a spring automatically locks the accessory to the work surface when the projections are fully engaged with the slots.

9 Claims, 7 Drawing Figures

4,633,789

TOOLLESS MOUNTING ARRANGEMENT

This application is a continuation of U.S. Ser. No. 641,916, filed Aug. 17, 1984.

FIELD OF THE INVENTION

This invention relates to an improved arrangement for mounting a component such as a drawer unit to the underside of a work surface, and particularly to a snap lock connection between a drawer unit and the underside of a work surface. The mounting arrangement of this invention allows the drawer unit to be mounted or demounted without the use of tools.

BACKGROUND OF THE INVENTION

A variety of arrangements for mounting a component such as a drawer unit to the underside of a work surface are known. All such mounting arrangements require some means for securely suspending the component from the work surface, and means for locking the installed component to the underside of the work surface so that the component or drawer unit will not become disengaged from the work surface during ordinary use. Such units long have, and typically still do, utilize bolts or screws for securing the unit to the work surface. The mounting or demounting of the unit can hence be difficult and time consuming, and requires the use of tools such as wrenches, screwdrivers and the like.

Units having projections or hooks which engage slots in the work surface have also been used. However, a fastener such as a screw is needed to ensure that the projection remains in engagement with the slot. Installation of such fastener requires the use of a tool such as a screwdriver.

An object of the present invention is to provide an arrangement for mounting a component or accessory, such as a file cabinet or drawer unit, to the underside of a work surface without requiring the use of any tools such as a screwdriver or wrench.

A specific object of the present invention is to provide a snap-lock connection arrangement for securely mounting a drawer unit to the underside of a table top.

An additional object of the present invention is to provide a releasable self-locking mounting arrangement so that the accessory or component can be easily removed from the underside of a work surface and easily remounted thereon in a different location.

Other objects and purposes of the invention will be apparent upon examination of the accompanying drawings and study of the following specification.

Figure 1:
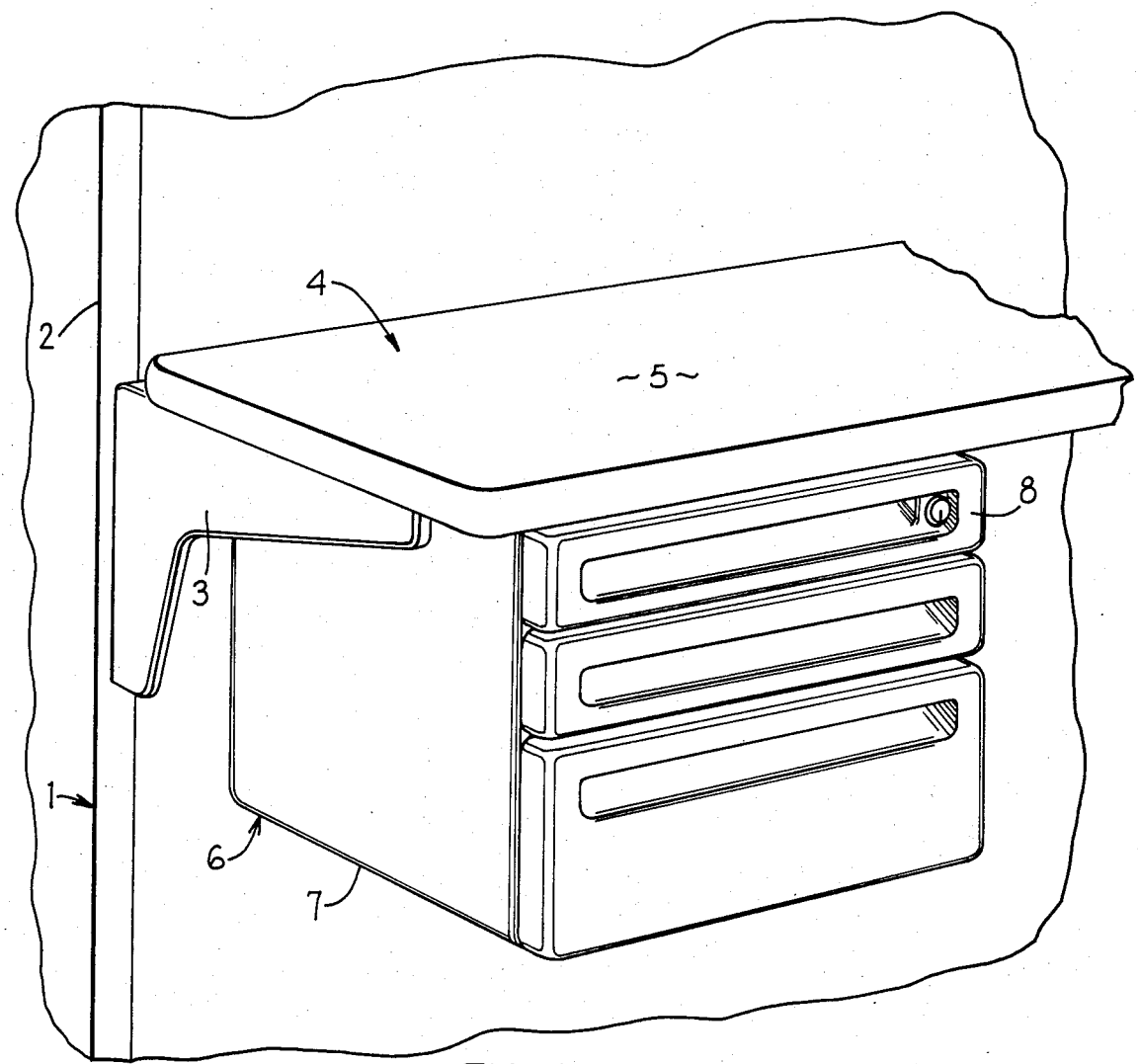
FIG. 1 is a perspective view of a typical arrangement showing a drawer unit suspended from the underside of a work surface.

Certain terminology will be used in the following description for convenience in reference only and will not be limiting. For example, the words "upwardly", "downwardly", "rightwardly" and "leftwardly" will refer to directions in the drawings to which reference is made. The word "front" will refer to the end thereof from which the drawers are opened, namely the leftward side in FIGS. 2 and 3. This terminology will include the words above mentioned, derivatives thereof and words of similar meaning.

SUMMARY OF THE INVENTION

The present invention relates to an improved mounting arrangement which includes a work surface and a removable component or accessory unit mounted on the underside of the work surface. The mounting arrangement includes a pair of front and rear slot-and-projection couplings for fixedly mounting the accessory unit to the underside of the work surface, and a spring for automatically locking the unit to the underside of the work surface without the use of tools. The spring locks the accessory unit by holding the projections in secure engagement with the corresponding slots.

In a preferred embodiment, the underside of the work surface has front and rear slots formed therein, and the top of the accessory unit has corresponding front and rear projections for engaging these slots. The spring is biased into the front slot between the front projection and the front end of the front slot, thereby locking the front projection in the rear end of the front slot. The rear end of the front slot has a raised ramplike cam along the edge thereof to create a snug frictional engagement with the front projection.

DETAILED DESCRIPTION

Figure 5:
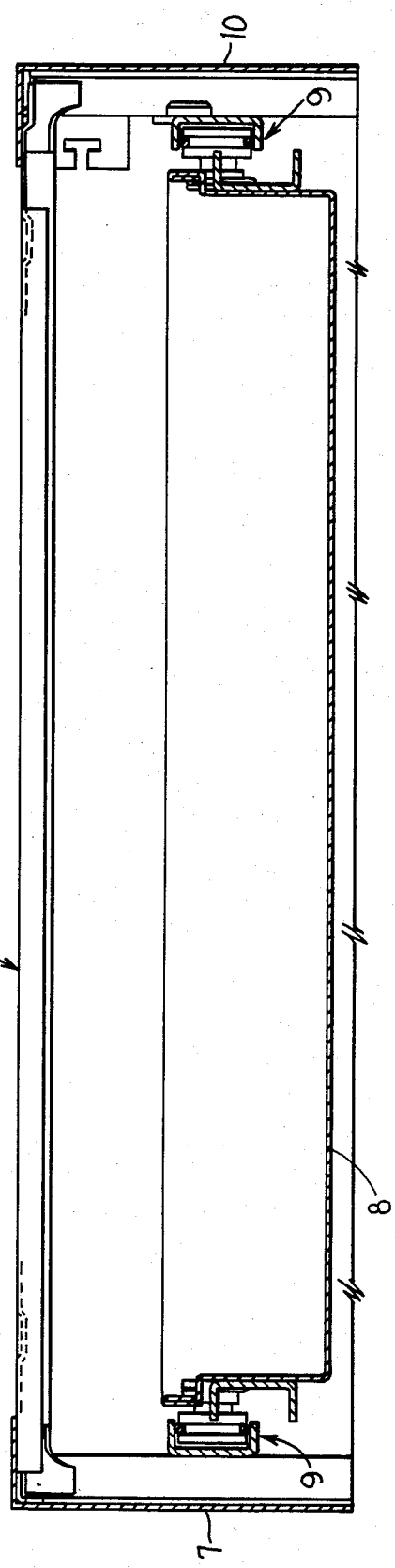
FIG. 5 is a partial, front cross-sectional view of the component in FIGS. 2 and 3.

Referring to the drawings, FIG. 1 shows a conventional arrangement 1 wherein an upright wall panel 2 has a plurality of cantilevered support arms 3 mounted thereon for supporting a work surface member or table top 4 having a substantially planar upper work surface 5. An accessory or component 6, such as a drawer unit or filing cabinet, is mounted to the underside of the work surface 4. The drawer unit 6 includes a housing 7 which supports a plurality of drawers 8 which can be opened from the front of the unit. As shown in FIG. 5, the drawers 8 are mounted for reciprocal movement by means of conventional slide assemblies 9 connected between the drawers 8 and sidewalls 10 of the housing 7.

Figure 2:
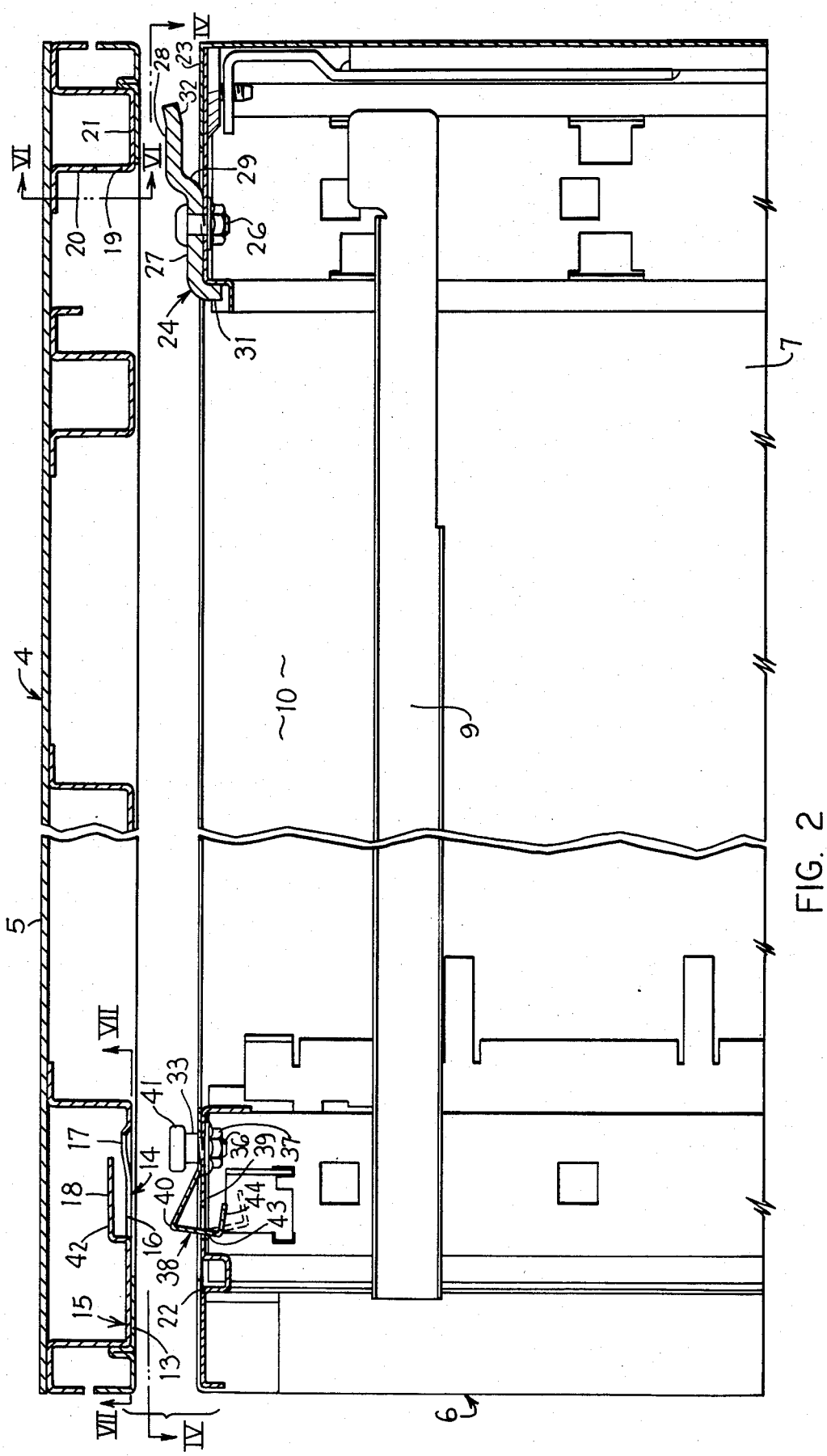
FIG. 2 is a partial cross-sectional view of the mounting arrangement according to the invention, showing the component detached from the underside of the work surface.
Figure 3:
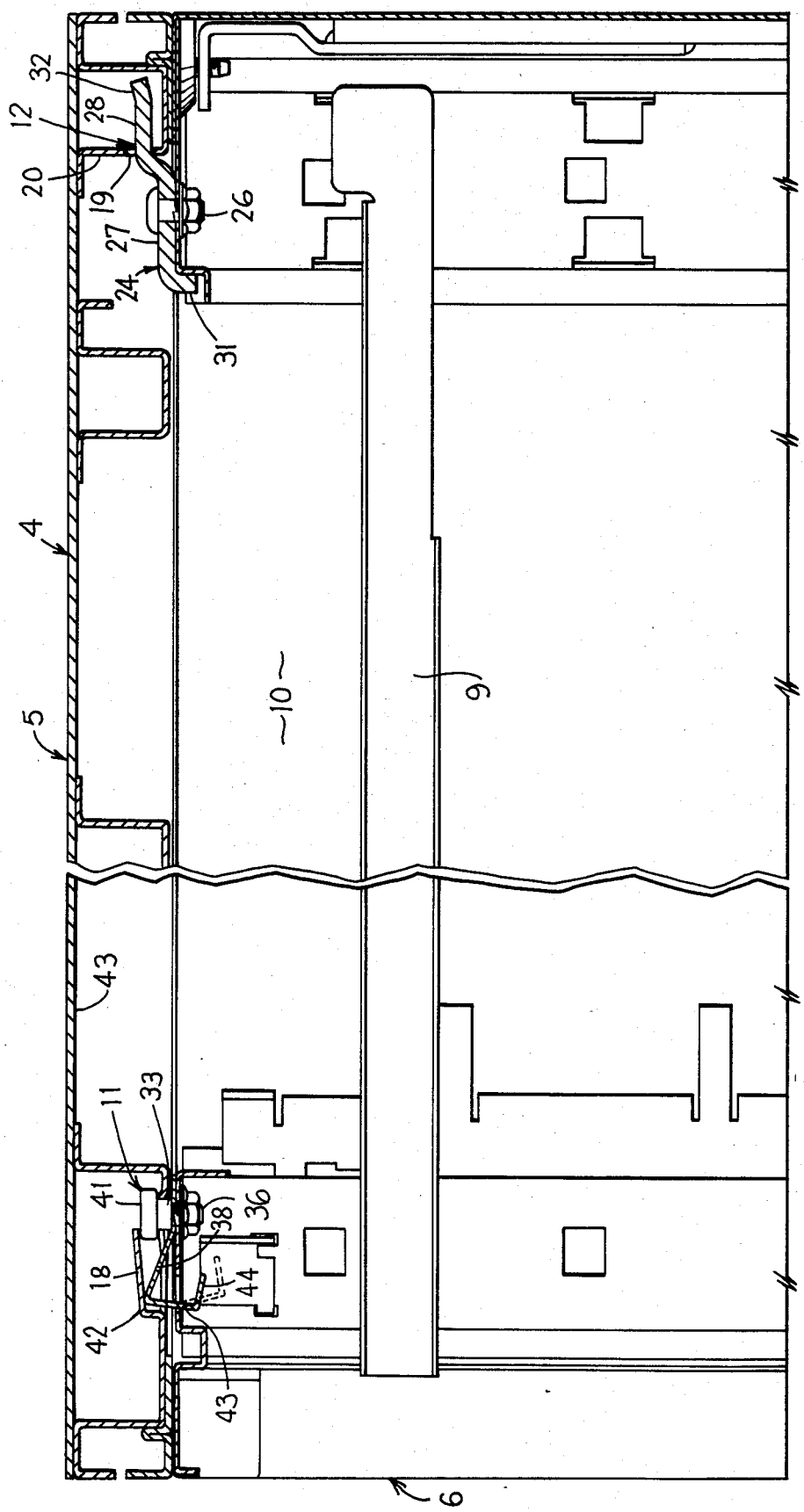
FIG. 3 is the same as FIG. 2 except that the component is engaged with and locked to the underside of the work surface.
Figure 4:
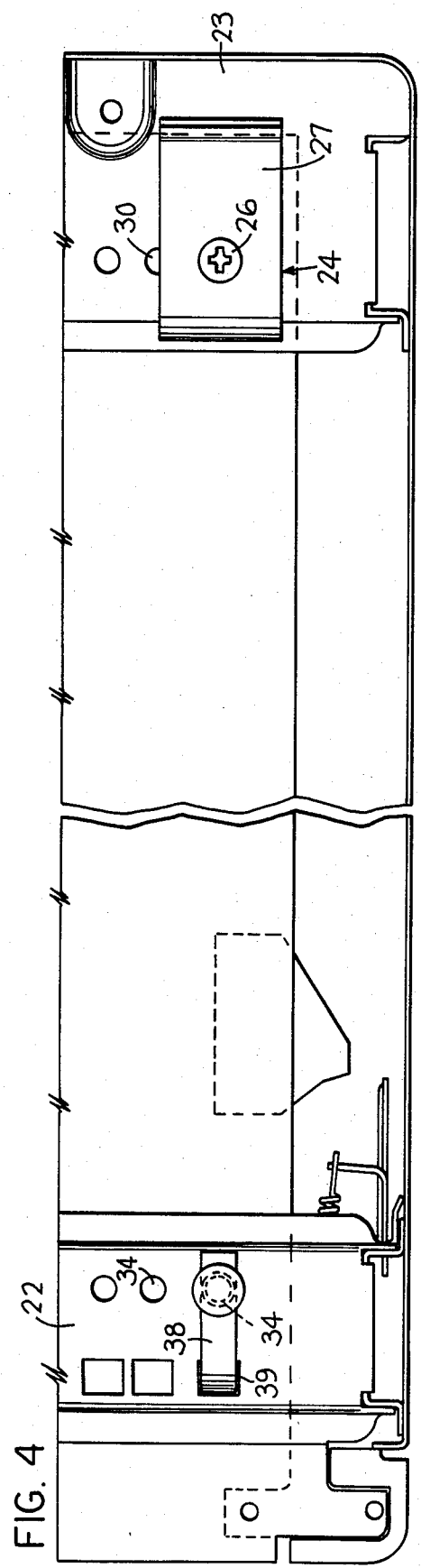
FIG. 4 is a partial top view, partly in section, of a right side portion of the component shown substantially along the line IV—IV in FIG. 2.

FIGS. 2 and 3 illustrate the mounting arrangement according to the present invention for mounting the drawer unit 6 in suspended relation below the work surface member 4. This mounting arrangement includes a pair of front projection-and-slot means 11 adjacent the upper front corners of the drawer unit 6, and a pair of rear projection-and-slot means 12 adjacent the upper rear corners of the drawer unit 6.

Figure 7:
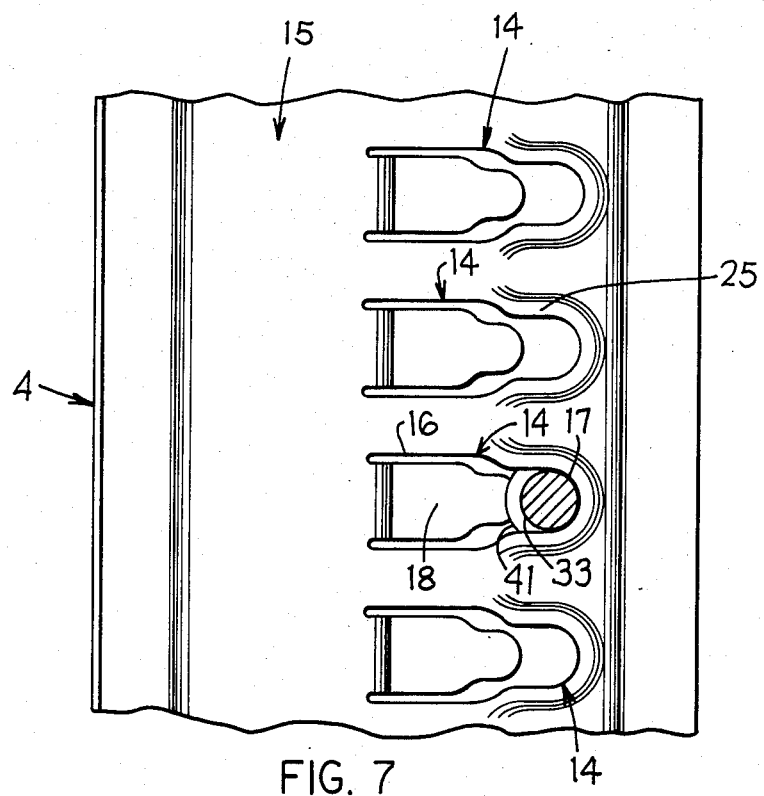
FIG. 7 is a view taken along the line VII—VII in FIG. 2.

Each projection-and-slot means 11 includes a keyhole-shaped slot 14 which opens downwardly from the bottom wall or underside 13 of the adjacent front edge of the work surface member 4. This slot 14 is elongated in the front-to-back direction of the drawer unit 6 and work surface member 4. As shown in FIG. 7, a plurality of front keyhole slots 14 are preferably formed in a row along the bottom wall 13 in parallel relation to the adjacent front edge of the work surface member 4. Each front slot 14 has a front slot portion 16 and a rear slot portion 17. The front slot portion 16 is of greater width than the rear slot portion 17.

The bottom wall 13 is part of a metal channel member 15 which comprises part of the work surface member 4 and extends lengthwise thereof. The slots 14 are stamped out of the wall 13, and a part of the wall 13 is deformed upwardly to form a ramplike cam 25 (see FIG. 7) in surrounding relation to the rear slot portion 17 so that the depth of the slot 14 tapers (i.e., decreases) from the end of the rear slot portion 17 forwardly as shown in FIG. 2. The front keyhole slot 14 is substantially horizontal, and a keyhole cover 18 integral with the wall 13 and formed during the stamping operation used to form the slots 14 covers each of the front slots 14. The keyhole cover 18 is spaced slightly upwardly from the bottom wall 13 and prevents the insertion of fingers through the slot 14 into dangerous positions.

The projection-and-slot means 11 also includes a front projection or mounting pin 33 which is an upright projection having an annular flange 41 at the upper end thereof. The mounting pin 33 is fixedly secured into one of a plurality of holes 34 in a front top wall 22 of the drawer unit 6. The front top wall 22 extends across the width of the unit 6 and spans the sidewalls 10. The mounting pin 33 has a threaded lower end 36 which extends through the hole 34, and a nut 37 threadedly coupled to the threaded end 36 secures the pin 33 to the front top wall 22. Prior to mounting of the pin 33, a spring plate 38 having a hole (not shown) therein is placed on the top wall 22 so that the hole in the spring plate 38 is aligned with the hole 34 in the front top wall 22, and the threaded lower end 36 of the mounting pin 33 is then extended therethrough so that the mounting pin assembly secures the spring plate 38 to the front top wall 22. The pin 33 has a shoulder directly above the lower threaded end, which shoulder abuts the spring plate to vertically locate the pin. The spring plate 38 extends forwardly and upwardly from the hole 34 of the top wall 22, is then bent downwardly into one of a plurality of upwardly opening front slots 39 formed in the top wall 22, and is then bent to extend substantially rearwardly below the top wall 22 so that the spring plate 38 is substantially hook-shaped in cross section. The spring plate 38 is biased to project upwardly beyond the top wall 22 as shown in FIG. 2, but can be pressed downwardly so that it is substantially flush with the top wall 22 whereby the bent end thereof assumes the position shown by dotted lines in FIGS. 2 and 3.

The rear projection-and-slot means 12, located at the rear left and right corners of the upper side of the unit 6, includes a plurality of rear, frontwardly opening slots 19 formed in a front wall 20 of a channel member 21 which is part of the work surface member 4 and extends lengthwise thereof in parallel with the channel member 15. A projection member 24 which is substantially Z-shaped in cross section is secured by a nut and bolt fastener 26 extending through one of a plurality of rear mounting holes 30 to a rear top wall 23 of the drawer unit 6. The rear top wall 23 extends across the width of the drawer unit 6 and spans the sidewalls 10, in parallel with the front top wall 22.

The rear projection 24 comprises upper and lower horizontal portions 28 and 27 integral with and connected by a substantially vertically extending portion 29 which gives the rear projection 24 its cross-sectional Z shape. The lower horizontal portion 27 has an opening therethrough for the fastener 26, and has a downwardly turned end 31 which extends over a front edge of the top wall 23. The upper horizontal portion 28 of the rear projection 24 extends rearwardly and has a slightly upwardly bent end 32.

The mounting arrangement according to the present invention is assembled as follows. First, the slightly upwardly bent ends 32 of the rear projections 24 are slightly inserted into selected rear slots 19 to provide at least partial support for the rear end of the unit 6. The front end of unit 6 is then lifted upwardly so that the front mounting pins 33 are inserted through the front portion 16 of the front keyhole slots 14. The flange 41 at the uppermost end of the mounting pin 33 has a diameter slightly less than the width of the front slot portion 16, but greater than the width of the rear slot portion 17. Once the flanges 41 have been inserted upwardly completely through the front slot portions 16, the drawer unit 6 is then pushed rearwardly relative to the work surface member 4. This causes the upper horizontal portions 28 of the rear projections 24 to be slidably inserted more fully into the rear slots 19, and simultaneously causes the pins 33 to travel rearwardly along the length of the front slots 14 until they enter the slot end portions 17. Since the flange 41 is of greater diameter than the slot end portion 17, the front end of the drawer unit 6 is thereby suspended from the front end of the work surface member 4. In addition, the flange 41 travels upwardly along the tapered portion of the slot 14 along the cam part 25 to lift the top wall 22 substantially flush with the channel bottom wall 13. This also causes the front pins 33 to be snugly frictionally held in place. The drawer unit 6 is thus securely fitted to the underside of the work surface member 4.

As the pin 33 moves rearwardly in the front slot 14, the spring plate 38 is initially deformed toward the phantom position by the bottom wall 13 of the channel member 15. When the upper edge 40 (i.e. the first bend) of the spring plate 38 clears the front wall 42 of the slot 14, the spring plate 38 resiliently snaps upwardly into the front slot 14 as shown in FIG. 3. By this means, the spring plate 38 locks the drawer unit 6 to the work surface 4 by preventing any significant forward movement of the drawer unit 6 relative to the work surface 4. Specifically, while the front face 43 of the spring plate 38 is normally slightly spaced from the front wall 42 of the slot 14, nevertheless slight forward movement of the unit 6 will cause wall 42 to abut wall 43 so as to prevent the pin 33 from moving forwardly back along the slot 14.

If it is desired to remove the drawer unit 6 from the work surface member 4, it is necessary to pull the lower end 44 of the spring plate 38 downwardly so that the spring plate assumes the phantom position shown in FIG. 3 and hence is withdrawn from the slot 14. With the spring plate 38 thus withdrawn, the mounting pin 33 can travel forwardly along the slot 14 and the rear projection 24 can be withdrawn from the rear slot 19 by pulling the drawer unit 6 forwardly relative to the work surface member 4.

Figure 6:
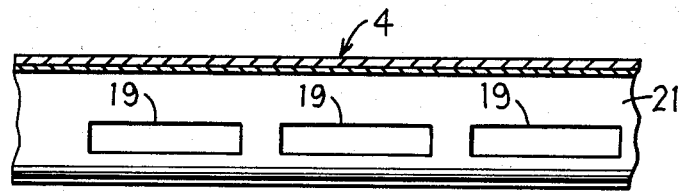
FIG. 6 is a view taken along the line VI—VI in FIG. 2.

According to preferred embodiments of the invention, a pair of parallel rows of keyhole slots 14 and vertical slots 19 are formed at regular intervals along the underside of the work surface member 4 in the channel members 15 and 21 respectively, as shown in FIGS. 6 and 7. This allows the greatest flexibility in installing a variety of drawer units or other desired components as needed. The component or drawer unit 6 preferably has two mounting pins 33 at the left and right front corners thereof and two rear projections 24 mounted at left and right corners thereof.

The rear projection 24 need not be Z-shaped in cross section, but preferably has a portion which is at least L-shaped in cross section. For example, the vertically extending portion 29 of the projection 24 could be integrally formed on the rear top wall 23, eliminating the need for the lower horizontal portion 27 and fastener 26.

The spring plate 28 need not be mounted by the pin 33, and the precise shape of the spring means is not critical, so long as it has a self-locking action for preventing the front and rear slot-and-projection means 11 and 12 from becoming disengaged during normal use.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a mounting arrangement including a work surface and a removable accessory mounted on the underside of said work surface, the improvement which comprises:

said work surface has a substantially horizontal, downwardly opening, elongated front slot formed on the underside thereof, said front slot tapering in depth forwardly from the rear end thereof in the lengthwise direction of said front slot;

said accessory has a front upright projection on top wall means thereof, said projection having flange means formed at the tip thereof, which front projection is inserted through a forward end portion of said front slot on the underside of said work surface and is then moved rearwardly and upwardly along said front slot to said rear end thereof, so that said front projection is snugly held at said rear end of said slot;

said accessory further has a self-locking releasable spring means for resiliently locking said front projection at the rear end of said front slot;

said spring means comprises a spring plate which extends forwardly from said front projection, resiliently snaps into said front slot as said front projection moves rearwardly along said front slot, and is adapted to engage a front wall of said front slot so as to prevent movement of said front projection forwardly within said front slot;

said work surface has a substantially vertical, frontwardly opening rear slot formed on the underside thereof, and said accessory has a rear, substantially horizontally extending projection which is inserted into said rear slot as said front projection is inserted into said front slot, which rear projection is locked into said rear slot by said spring means; and said work surface has a pair of parallel front and rear, upwardly opening channel members secured to the underside thereof, said rear channel member having a front wall which defines said rear slot therein, and said front channel member having a bottom wall which defines said front slot therein, said bottom wall of said front channel member defining a cover which extends over said front slot so that said spring plate contacts the underside of said cover when said spring plate is in locked position, said cover being integral with said bottom wall of said front channel member.

2. In a mounting arrangement including a work surface and an accessory removably mounted on the underside of said work surface, the improvement comprising:

front slot-and-projection coupling means for releasably mounting the front end of said accessory on the underside of said work surface, said front coupling means permitting assembly of said accessory and work surface by first requiring said accessory to be relatively moved substantially perpendicularly toward the underside of said work surface followed by slidable displacement accessory relative to the workpiece substantially horizontally rearwardly of the latter;

rear slot-and-projection coupling means for releasably mounting a rearward end of said accessory on the underside of said work surface, said rear coupling means permitting the rear end of the accessory to be initially moved relatively toward the work surface to effect partial engagement therebetween so as to effect at least partial support for the rearward end of the accessory prior to initial engagement of the front coupling means;

said front coupling means including a substantially horizontal, downwardly opening, elongated slot formed on the underside of said work surface, said front slot having a mouth of enlarged width adjacent the front end thereof and being of reduced width as the slot projects rearwardly of the work surface;

said front coupling means including a front upright projection on top wall means of said accessory, said front projection having flange means adjacent the upper end thereof, said front projection being moved upwardly with respect to the work surface so that the flange means is inserted through the mouth of the slot adjacent the front end thereof, with said accessory and the front projection then being moved rearwardly relative to the work surface so that the projection moves along the narrow portion of the front slot so that the flange means is captivated thereabove;

said rear coupling means including a slot formed in said work surface on the underside thereof in rearwardly spaced relationship from said front slot;

said rear coupling means including a rear projection which is fixed to said accessory adjacent the rearward end thereof, said rear projection projecting substantially horizontally rearwardly in a cantilevered fashion from said accessory so as to define a free rearward end, said free rearward end being partially insertable into said rear slot to effect partial support of the rearward end of the accessory from the work surface prior to the front projection being inserted through the mouth of the front slot; and self-locking releasable spring means coacting between said accessory and said work surface for automatically locking said front projection adjacent the rearward end of said front slot to prevent accidental disengagement of said accessory from said work surface.

3. A mounting arrangement according to claim 2, wherein said spring means comprises a spring plate which is mounted on said accessory and extends forwardly from said front projection, said spring plate being engaged with and resiliently deflected downwardly by the underside of the work surface when the front projection is moved upwardly through the mouth of said front slot, said spring plate automatically resiliently snapping into the mouth of said front slot as the front projection moves into the rearward end of said front slot so that the spring plate abuts the front end of said front slot to prevent forward movement of the accessory relative to the work surface, said spring plate having a part thereof which is manually accessible so as to be manually downwardly withdrawn from the mouth of said front slot when release of the accessory from the work surface is desired.

4. The combination comprising:

a work surface having a substantially planar and horizontally extending top surface of enlarged extent, and a bottom surface which is fixedly related relative to the top surface and includes at least front and rear surface portions which extend substantially horizontally and are respectively disposed in the vicinity of the front and rear edges of the work surface;

an accessory adapted to be removably but fixedly mounted on said work surface so as to be disposed directly adjacent and downwardly suspended from the underside of said work surface, said accessory including a housing having at least one drawer unit horizontally slidably supported thereon, said housing having a top wall adapted to be disposed closedly adjacent and substantially contacting the front and rear bottom surface portions of said work surface when the accessory is suspended therefrom;

said housing having a pair of front upright projections fixed thereto and projecting upwardly from the top wall thereof in the vicinity of the front corners of said housing, each said upright projection having an enlarged head fixedly associated therewith in the vicinity of the upper end thereof;

said work surface having, in the front surface portion of said bottom surface, a pair of front slots which are sidewardly spaced apart and open upwardly of said front surface portion for communication with a hollow region disposed thereabove, the sideward spacing between said front slots being substantially equal to the spacing between said upright projections;

each of said front slots being substantially horizontally elongated in a direction toward a rear edge of said work surface, each said front slot having a front slot portion which is of a width at least slightly greater than the cross-sectional dimension of the enlarged head so that the latter can pass upwardly through the front slot portion into the hollow interior thereabove, each said front slot also having a rear slot portion which communicates with the front slot portion but is of narrower width so as to captivate the head of the front upright projection above the front slot;

said work surface having, at a distance which is spaced significantly from the front edge thereof, a pair of sidewardly spaced rear slots which are accessible solely from the underside of said work surface, said rear slot at one end thereof being defined by a member which is fixedly associated with the work surface and defines thereon an upwardly facing shoulder which is spaced downwardly a substantial distance from said top surface, said work surface defining therein an open region above said shoulder but below said top surface, said rear slot providing communication with said open region;

said housing having a pair of rear projections fixed thereto in sidewardly spaced relationship adjacent the opposite rear corners thereof, each said rear projection being fixed to said housing and projecting substantially horizontally rearwardly in a cantilevered manner from its point of attachment to the housing so as to define an elongated leg which projects rearwardly and terminates in a free end portion, said leg being adapted to project into and through the rear slot so as to be positioned above and bear against said shoulder, said leg having sufficient length to bearingly engage against said shoulder and partially support the weight of said accessory when said front projection is disposed within the front portion of the respective front slot; and self-locking releasable spring means mounted on one of said work surface and accessory for automatically springingly engaging within the front portion of the front slot when the front projections are moved into the rear portions of the front slots to positively lock the accessory to the work surface.

5. A combination according to claim 4, wherein each of said rear projections is substantially L-shaped and includes a vertical leg part which is fixed to and projects upwardly from the top wall of said housing and at its upper end is joined to the forward end of said rearwardly projecting leg.

6. A combination according to claim 5, wherein said rear projection is formed from a substantially flat plate-like member.

7. A combination according to claim 6, wherein said spring has one end thereof fixedly mounted to the top wall of said housing, said spring projecting upwardly above said top wall when in a normal position and having a free end part which projects downwardly through an opening in said top wall, said spring being resiliently deflected downwardly so as to be substantially flush with the top wall when the latter is disposed directly under the front surface portion and the front projection extends through the front slot portion, said spring projecting upwardly into the front slot portion when the front projection is slidably moved rearwardly into the rear slot portion, the free end part of said spring projecting downwardly through the opening in said top wall when the spring is engaged within the front slot portion so as to be manually accessible from below said top wall to permit the spring to be manually displaced downwardly from its engagement within the front slot portion.

8. A combination according to claim 7, wherein said rear slots are formed in a vertically extending but forwardly facing wall defined on the underside of said work surface.

9. A mounting arrangement according to claim 1, wherein said spring plate has means accessible from the underside of the accessory for removing said spring from said front slot to allow forward movement of said front and rear projections so that said accessory can be released from the underside of said work surface.

* * * * *